United States Patent [19]
Zittel et al.

[11] Patent Number: 5,669,288
[45] Date of Patent: Sep. 23, 1997

[54] ROTATING DRUM FOOD PROCESSOR WITH CLEANING SPRAY ACCESSIBLE PANELS

[75] Inventors: David R. Zittel, Columbus; Steven B. Malchow, Lake Mills, both of Wis.

[73] Assignee: Lyco Manufacturing, Inc., Columbus, Wis.

[21] Appl. No.: 624,059

[22] Filed: Mar. 29, 1996

[51] Int. Cl.⁶ .............................. A23L 3/00; A23N 12/00; A47J 37/12; F25D 25/02
[52] U.S. Cl. .................. 99/348; 99/355; 99/360; 99/404; 99/409; 99/470; 99/443 C; 99/517; 134/65; 134/132; 366/234; 366/318
[58] Field of Search .................... 99/348, 352–355, 99/360, 365, 403, 404, 409, 450, 470, 483, 487, 516, 517, 534–536, 477–479, 443 R, 443 C; 366/81, 91, 101, 102, 234, 290, 318, 319, 322, 324; 134/65, 132; 62/381; 100/117, 145; 210/403, 456, 338, 377

[56] References Cited

U.S. PATENT DOCUMENTS

| | | | |
|---|---|---|---|
| 1,599,805 | 9/1926 | Barsam . | |
| 1,764,039 | 6/1930 | Cooper . | |
| 3,834,431 | 9/1974 | Zittel et al. | 141/131 |
| 4,437,395 | 3/1984 | Speaker | 99/355 |
| 4,688,476 | 8/1987 | Zittel | 99/403 |
| 4,852,475 | 8/1989 | Yang | 99/404 |
| 4,873,920 | 10/1989 | Yang | 99/409 |
| 4,875,344 | 10/1989 | Zittel | 62/381 |
| 4,981,073 | 1/1991 | Zittel | 99/636 |
| 5,041,223 | 8/1991 | Johansson et al. | 210/403 |
| 5,111,929 | 5/1992 | Pierieck et al. | 198/495 |
| 5,133,249 | 7/1992 | Zittel | 99/348 |
| 5,146,841 | 9/1992 | Zittel | 99/348 |
| 5,327,817 | 7/1994 | Zittel | 99/348 |
| 5,329,842 | 7/1994 | Zittel | 99/348 |
| 5,332,103 | 7/1994 | Zittel | 209/664 |
| 5,341,729 | 8/1994 | Zittel | 99/348 |
| 5,427,015 | 6/1995 | Zittel | 99/348 |
| 5,429,041 | 7/1995 | Zittel | 99/348 |
| 5,433,849 | 7/1995 | Zittel | 210/377 X |
| 5,456,091 | 10/1995 | Zittel | 62/375 |
| 5,517,906 | 5/1996 | Zittel et al. | 99/352 X |
| 5,518,614 | 5/1996 | Zittel | 210/403 |

*Primary Examiner*—Timothy F. Simone
*Attorney, Agent, or Firm*—Nilles & Nilles, S.C.

[57] ABSTRACT

A blancher or cooler has a drum made up of a plurality of stainless steel perforated panels. The drum is rotatably mounted within a water tank, and has an auger for progressing food products from an inlet to an outlet. The panels are bolted between C-channels which are welded to end plates to define the drum, and steel angle brackets clamp the panels in place. The angle brackets have slots with enlarged openings at one end. For periodic cleaning the nuts which clamp the brackets to the C-channels are loosened part way, the brackets are removed by passing the bolt heads through the enlarged openings, and the unclamped panels are allowed to hang freely on the C-channels. In this condition all regions of the panels are accessible to cleaning spray as the drum is rotated. The brackets are rapidly replaced and the nuts fully tightened to return the apparatus to service. Alternatively, the panels are held to the C-channels by quick release push pull clamps which, when released, allow the panels to hang from the C-channels for cleaning. A clean in place system has a manifold mounted to a tank side wall which discharges warm water upwardly onto the rotating loosened panels of the drum.

11 Claims, 4 Drawing Sheets

ROTATING DRUM FOOD PROCESSOR WITH CLEANING SPRAY ACCESSIBLE PANELS

FIELD OF THE INVENTION

The present invention relates to rotating perforated drum food machinery in general, and to the cleaning assisting aspects of such machinery in particular.

BACKGROUND OF THE INVENTION

Commercial quantities of food products such as pasta, green peas, corn, beans and other processed food products are often processed in rotating drum blanchers or coolers. These machines employ a cylindrical dram which is formed of perforated stainless steel sheet which rams within a water filled tank. The dram has a helical auger therein which advances food product in a continuous flow from an inlet end of the drum to an outlet end.

Cleanliness has always been a concern in the food processing industry, and careful hygienic standards have been scrupulously observed throughout the industry for many years. Nevertheless, increasing levels of concern on the part of governmental regulatory agencies have resulted in stricter standards and more exacting levels of inspection of machinery which comes in contact with food for human consumption.

It has thus become necessary in rotating drum blanchers and coolers to provide access for cleaning sprays to all joints and cavities where the possibility of contaminant accumulation exists. In the past it has been necessary to actually separate the perforated steel skin panels of the rotating drum from the structural framework to meet regulatory requirements. This separation involves levels of labor and machine down time which it would be desirable to reduce.

What is needed is a rotating drum food processing apparatus which could be rapidly adjusted for cleaning and returned to service with minimal down time.

SUMMARY OF THE INVENTION

The food processing apparatus of this invention has a rotatable drum which has two end plates which are connected by C-channels. A helical auger extends from the inlet end of the drum to an outlet end for advancing food product through the drum. The drum is mounted to rotate within a water filled tank. A perforated skin is formed around the drum by a plurality of perforated steel skin panels. Certain of the skin panels are hinged to the C-channels to serve as access doors. The remainder of the skin panels have radially extending flanges which engage alongside the radially extending arm of a C-channel. Lengths of right-angle bracket are clamped by a clamping means to the C-channels with a flange of a skin panel engaged between the bracket and the channel. The clamping means may be bolt fasteners, or quick release push-pull clamps. The skin panels are thus held firmly in place during food processing activities. When it is desired to clean the apparatus, the bolts are loosened part way, and the angle brackets are shifted to bring the bolt heads in alignment with larger diameter openings in the brackets to allow removal of the brackets. The panels then hang loosely on the drum, and allow the access of cleaning sprays to all regions of the panel. Once cleaned the angle bracket is rapidly replaced and the bolts tightened to put the apparatus back in service.

In an alternative embodiment, the panels are held to the C-channels by quick release push pull clamps which, when released, allow the panels to hang from the C-channels for cleaning. A clean in place system has a manifold mounted to a tank side wall which discharges warm water upwardly onto the rotating loosened panels of the drum.

It is an object of this invention to provide a food processing apparatus which is maintainable in a hygienic fashion.

It is a further object of the present invention to provide a rotating drum food processing apparatus which may be readily convened from a service position to a cleaning position.

It is an additional object of the present invention to provide a rotating drum food processing apparatus which can be fully cleaned with minimal disassembly.

Further objects, features and advantages of the invention will be apparent from the following detailed description when taken in conjunction with the accompanying drawings.

DESCRIPTION OF THE PREFERRED EMBODIMENT

Figure 1:
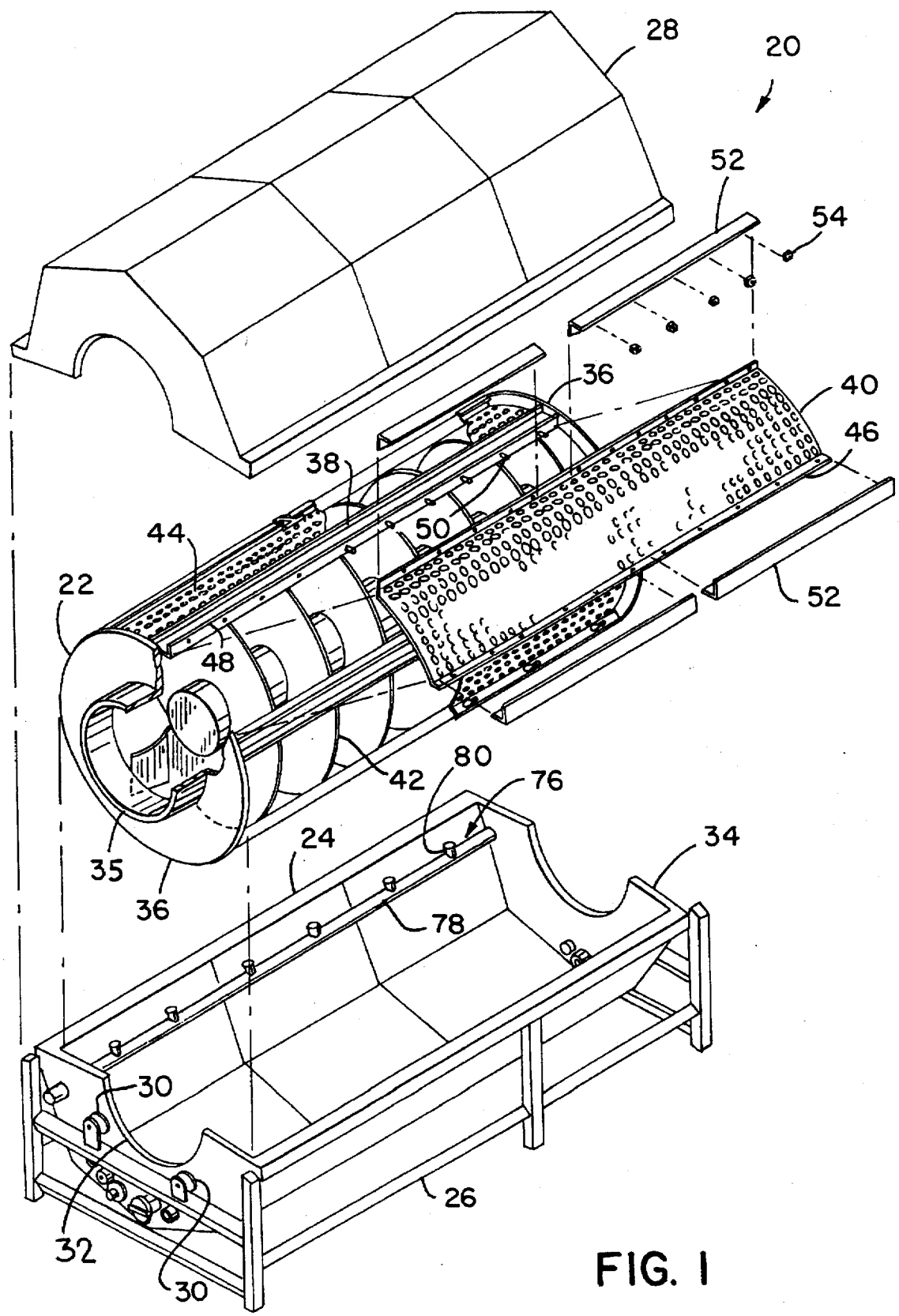
FIG. 1 is an exploded isometric view of a blancher having cleaning spray accessible panels of this invention.

Referring more particularly to FIGS. 1–8 wherein like numbers refer to similar parts, a food processing apparatus 20 is shown in FIG. 1. Although the apparatus 20 is referred to hereafter as a blancher, i.e., a device for treating food products in water at elevated temperatures, it is to be understood that the apparatus of this invention may also be used as a chiller for cooling food products. The blancher 20 is of the type having a rotatable cylindrical drum 22 which is supported for rotation within a water filled tank 24 which is supported on a frame 26. A cover 28 extends over the drum 22 and permits control of the atmosphere within the blancher 20. Two trunions 30 are mounted to the frame 26 at the inlet end 32 and at the outlet end 34 of the tank 24. The trunions 30 engage cylindrical journals 35 which extend axially outwardly from the drum 22 and rotatably support the drum, which is driven by a motor which engages a sprocket (not shown) which is mounted coaxially with a journal.

The drum 22 may be formed in a conventional manner, or may be formed as in U.S. Pat. No. 5,146,841, to Zittel, the disclosure of which is incorporated by reference herein. Two spun stainless steel end plates 36 are connected by six C-channel support members 38 which extend axially between the inlet end plate and the discharge end plate. The support members 38 are connected to the peripheral edges of the end plates 36, such as by welding.

The drum 22 is enclosed by a cylinder composed of a plurality of perforated skin sheets or panels 40 attached between the channel members 38 to surround a helical auger 42. In an exemplary embodiment, the drum 22 is approximately twelve feet in length and nine feet in diameter. Although a single skin panel 40 is shown in FIG. 1 to extend the length of the drum 22, a number of overlapping panels may be provided. Typically a drum 22 will have one to three access doors 44, which are hingedly connected to the channel members and which are held in place by quick release clamps. Such doors 44 fully pivot away from the drum interior, and are easily cleaned.

In operation the food product such as pasta, pouched meat products, vegetables, or the like, is introduced into the inlet end 32 of the drum where it is received within water in the tank 24. The auger 42 advances the food product through the drum 22, while the perforations in the skin panels 40 and doors allow water to freely circulate between the tank and the drum, while retaining food product within the drum.

The apparatus 20 will typically be employed in continuous food processing operations, and may be used for many hours to treat thousands of pounds of food products. Periodically, the apparatus 20 will temporarily be halted and cleaned. This cleaning will serve to remove food residue and other material build-up and will allow the apparatus to meet industry and governmental regulations for food processing equipment.

The apparatus 20 of this invention has perforated panels 40 which attach to the drum 22 in a manner which facilitates cleaning of all surfaces with minimal effort.

Figure 3:
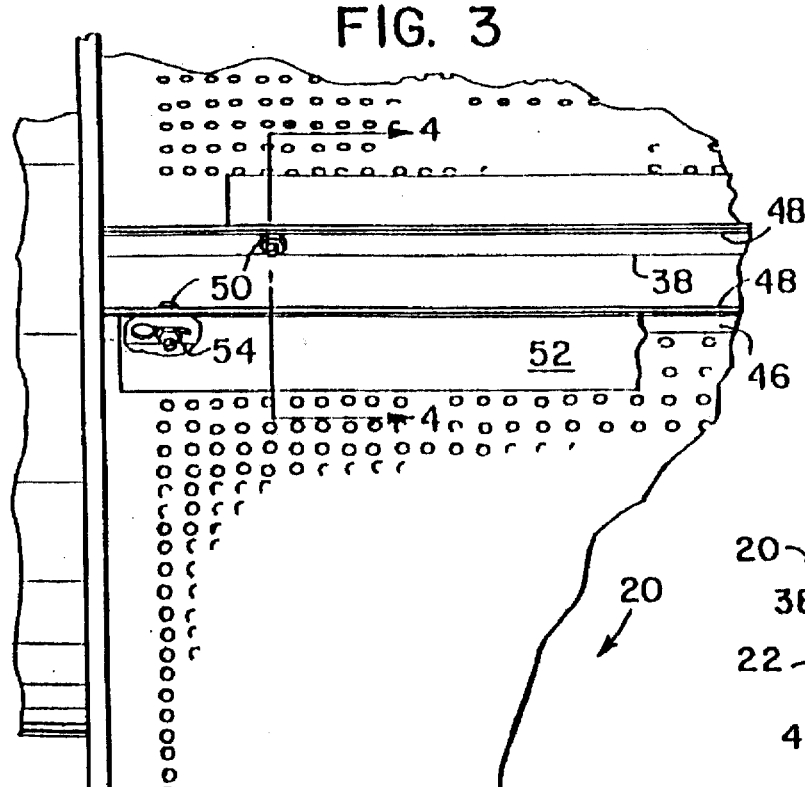
FIG. 3 is a fragmentary side elevational view of the blancher of FIG. 1.
Figure 4:
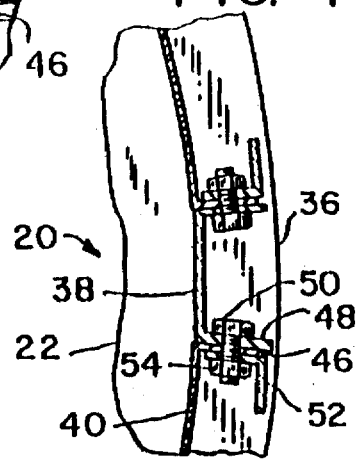
FIG. 4 is a fragmentary cross-sectional view of the blancher of FIG. 3 taken along section line 4—4.

As shown in FIG. 4, each skin panel 40 has two radially extending flanges 46 which extend at slightly more than 90° from the perforated panel 40 and which extend axially the length of the panel. The panels 40 are formed of perforated stainless steel plate which is conformed to the curvature of the drum. Each flange 46 of a panel 40 engages alongside the radially extending arm 48 of a C-channel 38. Holes are formed in the C-channel arm 48 which align with holes in the panel flange 46, and bolts 50 extend through the holes. The panel flanges 46 are clamped in place to the C-channels 38, as shown in FIG. 3, by lengths of right-angle bracket 52, preferably formed of stainless steel.

Nuts 54 engage with the bolts 50, and are tightened down against the angle brackets 52 to hold the panels 40 in place securely against the C-channels 38. The bolts extend through slots 56 in the brackets 52.

Figure 2:
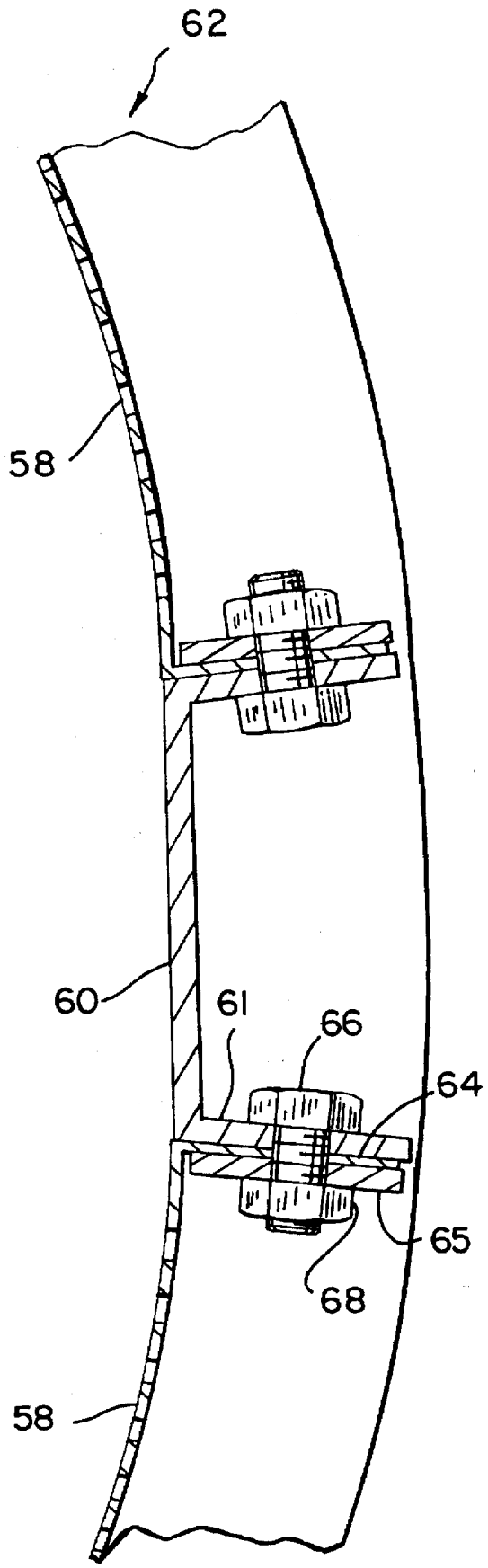
FIG. 2 is a cross-sectional view of a prior art blancher panel attachment.

A prior art attachment arrangement for perforated panels 58 to the C-channel member 60 of a prior art blancher 62 is shown in FIG. 2. In the prior art apparatus 62, the flanges 64 of the panels 58 are positioned between an arm 61 of the channel member 60 and a length of steel bar stock 65. Bolts 66 extend through the arm 61, the flange 64, and the bar 65, and are retained by nuts 68. Although effectively retaining the panels 58 in engagement with the channel members 60, this arrangement requires that the nuts 68 be completely unscrewed from the bolts 66, and the bars 65 and panels 58 be removed from the apparatus 60 before cleaning of the interstices between the flanges, the arms, and the bars. This is a time consuming process, and hence costly both in terms of labor and of machine down time.

Figure 5:
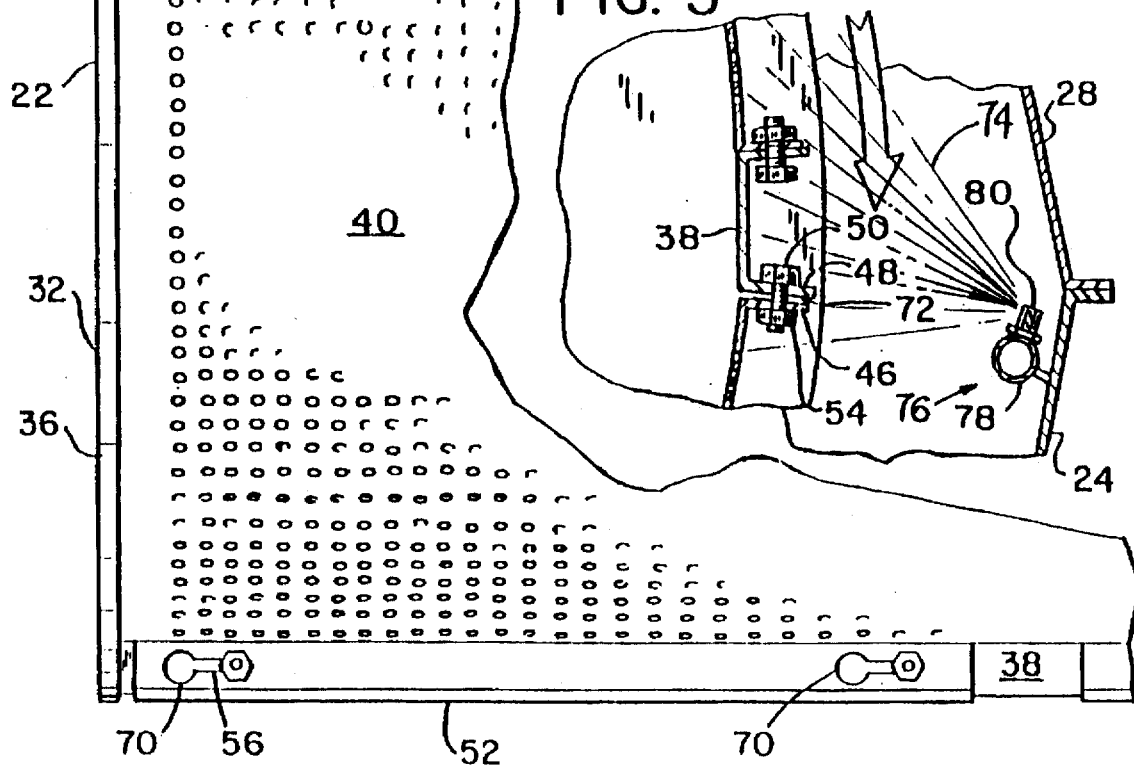
FIG. 5 is a cross-sectional view of the blancher of FIG. 4 with the panels in a loosened configuration for access by a cleaning spray.

As shown in FIGS. 3, 4 and 5, the apparatus 20 of this invention provides for rapid cleaning of the interstices between the panel flanges 46 and the arms 48 of the C-channel members 38. As best shown in FIG. 3, each slot 56 in the angle bracket 52 terminates in a nut pass-through opening 70 which is larger than the nut 54. The angle brackets 52 do not extend the entire width of the drum 22, but are shorter by a sufficient amount to allow the entire bracket 52 to be slid axially along the C-channel member the length of the slot 56. Hence, by loosening the nuts 54 sufficiently to allow sliding movement of the brackets 52, the brackets may be displaced sidewardly to permit the nuts 54, while still attached to the bolts 50, to pass through the openings 70. The brackets 52 may thereby be removed from the apparatus 20 without fully removing the nuts 54, and while still retaining the skin panels 40 connected to the C-channel members 38.

The retained panels 40, however, will no longer be tightly engaged against the channel members 38, but will have slack slightly greater than the thickness of the metal of the angle brackets 52, or about 3/16 inches. As shown in FIG. 5, the force of gravity will thus separate the panel flange from an overhead C-channel member, while the bolts will still retain the panels in loose engagement. As the drum 22 is rotated, each joint between a panel 40 and a channel member 38 will come into a position in which a gap 72 will be formed between the flange and the channel member.

Often blanchers and coolers are supplied with internal plumbing for discharging cleaning liquid throughout the interior. The clean in place system 76, shown in FIGS. 1 and 5, sprays cleaning liquid, typically water at an elevated temperature, onto the rotating drum. This water 74 will pass through the gap, and will rapidly discharge any sediment or food particles retained therein. The system 76 consists of a manifold 78 which is mounted to one wall of the tank. The fluid 74 is dispersed through a plurality of nozzles 80 in a cleaning spray. An exemplary nozzle is the VeeJet® H-U medium capacity standard type spray nozzle available from Spraying Systems Co., P.O. Box 7900, Wheaton, Ill., 60189-7900. The accessible panels of this invention may be used with prior art clean in place systems, such as those which are mounted to the tank cover. However, in a preferred embodiment the manifold 78 is mounted to a sidewall of the tank 24 as shown in FIG. 5. The nozzles 80 are spaced about 14 inches apart along the manifold. Because the manifold 78 is mounted in close proximity to the rotatable drum 22, the nozzles 80 are preferably tilted to discharge the spray of cleaning fluid upwardly, to cover a greater area of the drum as it rotates past the spray.

Once the apparatus 20 has been thoroughly cleaned, the angle brackets are positioned over the nuts and slid into place. The nuts are then tightened to bring the skin panels into secure engagement with the channel members. The apparatus is then ready to be returned to service.

The time to loosen the nuts and remove the angle brackets should be significantly reduced from the time to remove the fasteners entirely and remove the skin panels on the prior art device 62. Furthermore, a single person can easily remove the comparatively light weight brackets with minimal difficulty. In addition, much less floor space is required to store the brackets during the cleaning as compared to that required for storing entire panels.

It should be noted that the perforated panels 40 have been depicted with the relative dimensions of the perforations exaggerated for clarity. In general, perforations will be selected of a size sufficient to retain food product within the drum 22.

Figure 6:
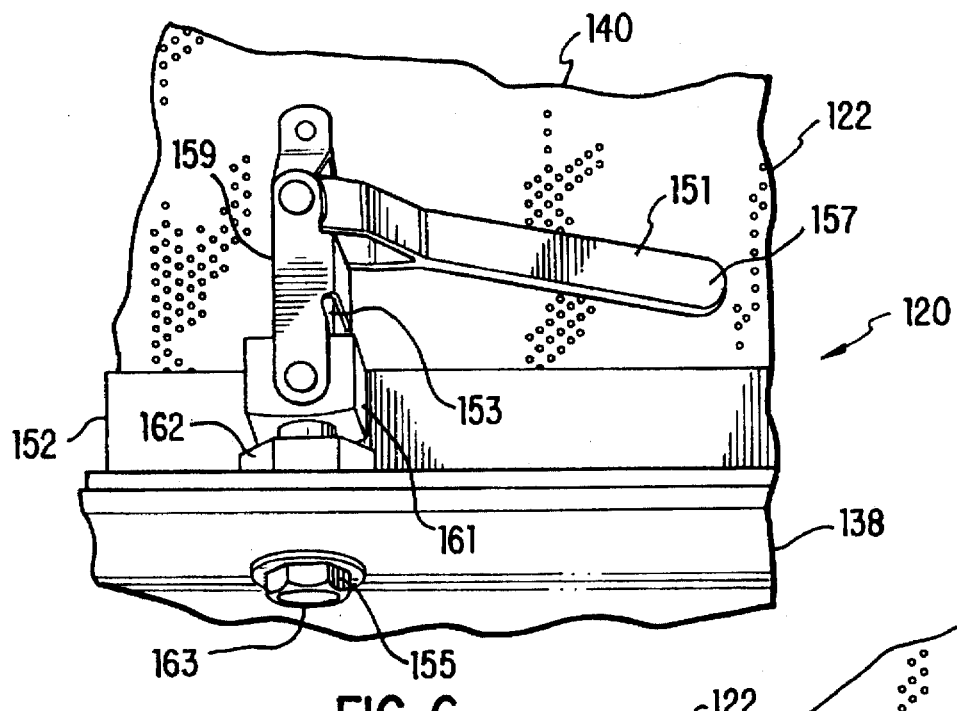
FIG. 6 is a fragmentary side elevational view of an alternative embodiment blancher of this invention having cleaning spray accessible panels, showing a panel clamped in place.
Figure 7:
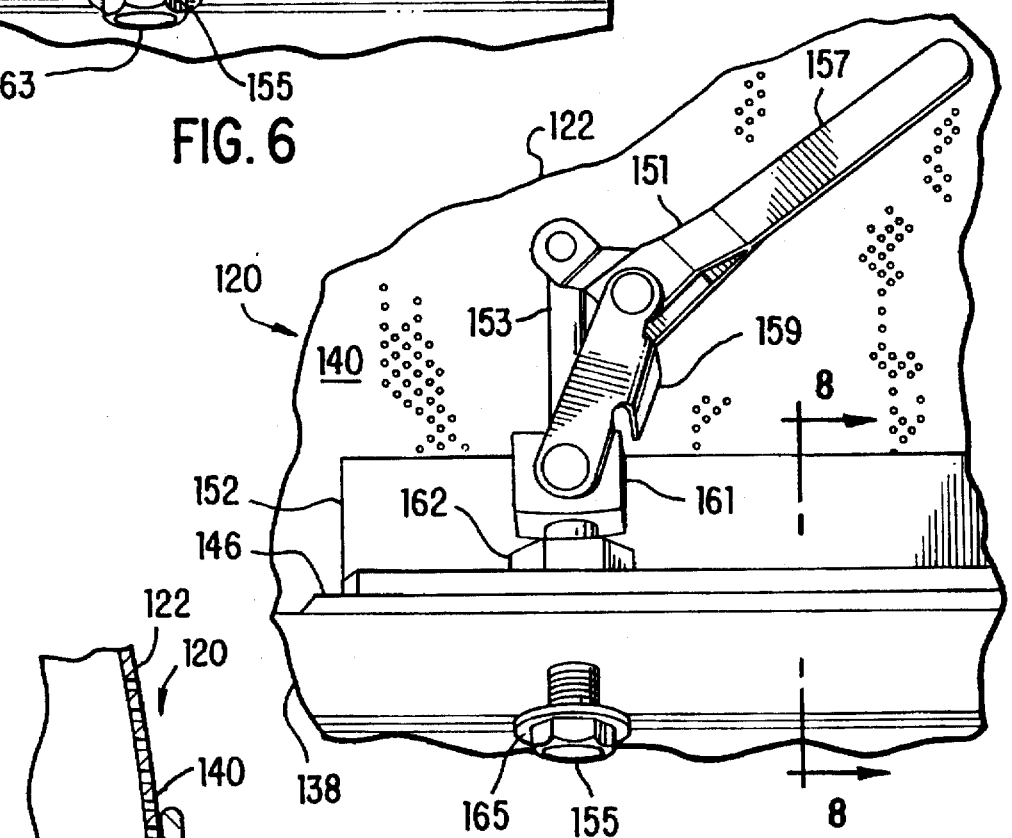
FIG. 7 is a fragmentary side elevational view of the apparatus of FIG. 6 with the clamp released to permit cleaning of the device.
Figure 8:
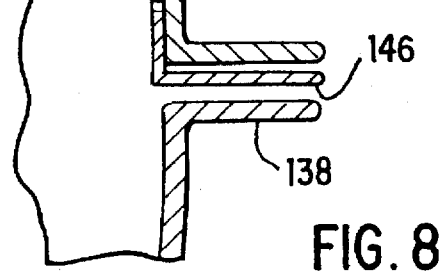
FIG. 8 is a fragmentary cross-sectional view of the apparatus of FIG. 7 taken along section line 8—8

An alternative embodiment food processing apparatus 120 which uses quick release clamps is shown in FIGS. 6–8.

The apparatus 120 is a blancher or cooler substantially similar to the apparatus 20. However, rather then being bolted in place, the perforated panels 140 which form the skin of the drum 122 are clamped to the C-channels 138 by quick release clamps 151. The clamps 138 connect an angle bracket 152 over a panel 140 flange 146 to the C-channel 138. The brackets 152 in an exemplary apparatus 120 are four feet long, with a clamp 138 positioned at each end of the bracket and one in the middle. There is an overlap of adjacent skin panels 140 of about ⅜ of an inch. The clamps 138 are of the push-pull type available from Destaco at P.O. Box 2800, Troy, Mich, 48007-2800 as model number 604.

As shown in FIG. 6, each clamp 151 has an internally threaded tube 153, which receives a hex head Nylock bolt 155. The bolt 155 can be adjusted in the tube 153 to achieve the desired tightness of clamping. The bolt head 163 bears against a washer 165 which engages the C-channel 138. A handle 157 is pivotably connected to the top of the tube 153, and a link 159 extends between the handle 157 and a square clamp member 161 which bears on a hex washer 162. The clamp member 161 is slidable on the tube to bear on through the hex washer 162 on the bracket 152. By lifting up on the handle 157, the clamp member 161 is released from applying clamping engagement to the bracket 152, and a gap between the head of the bolt 155 and the C-channel 138 is introduced. The released clamp 151, as shown in FIGS. 7 and 8, allows the skin panel 140, which is still loosely engaged on the tube 153, to hang from the C-channel 138 when the drum 22 is rotated. When the clean in place system is activated, cleaning fluid can not only be discharged over the surfaces of the panels, but also onto the flanges 146 of the panel as they are suspended on the tubes 153. The skin panels 140 are put back into service by simply closing the clamps 151.

By use of the quick release clamps 151, no parts need be removed from the apparatus 120 in order to begin the cleaning. Consequently, no space need be set aside for storage of parts while the cleaning is under way. To aid in clamping and unclamping the clamps 151, an extension handle (not shown) may be engaged with the handle 157 to provide leverage for clamping and unclamping. Quick release clamps 151 are preferably provided along both the upper flange and the lower flange of the skin panels 140.

It should be noted that the cleaning spray accessible panels and clean in place system of this invention, in addition to being suited for rotating drum blanchers, may be used with rotating drum chillers or coolers, as well as combination cookers and coolers, such as those described in U.S. Pat. Nos. 5,329,842 and 5,429,041, the disclosures of which are incorporated by reference herein.

It is understood that the invention is not limited to the particular construction and arrangement of parts herein illustrated and described, but embraces such modified forms thereof as come within the scope of the following claims.

We claim:

1. A food processing apparatus comprising:
   a) a tank;
   b) a drum rotatable within the tank, wherein the drum has a plurality of support members which extend between an inlet plate and an outlet plate;
   c) at least one perforated skin panel which extends between support members, wherein the skin panel has a flange which extends adjacent a support member;
   d) a bracket which overlies the skin panel flange, wherein portions of the bracket define at least two fastener slots, having an enlarged opening at one end; and
   e) a fastener which extends through each of said fastener slots, wherein the fasteners may be tightened to secure the bracket to the support member with the skin panel therebetween to retain the skin panel to the drum, and wherein the fasteners may be loosened to permit the release of the bracket from the support member to thereby permit the skin panel to hang loosely on the drum for rotation through a cleaning liquid to thereby remove accumulated contaminants.

2. The food processing apparatus of claim 1 further comprising:
   a) a clean in place manifold connected to the tank; and
   b) a plurality of nozzles mounted to the manifold and directed to discharge cleaning fluid onto the drum.

3. The food processing apparatus of claim 2 wherein the nozzles are positioned on the manifold to discharge a spray of cleaning fluid upwardly onto the drum as it is rotated.

4. The food processing apparatus of claim 1 wherein each fastener comprises a bolt having a nut connected thereto, wherein each nut is rotatable to secure an angle bracket to a support member, to thereby retain the skin panel in engagement with the support member.

5. The food processing apparatus of claim 4 wherein each bracket slot has a first portion which is narrower than the bolt, and a second portion which is wider than the bolt, such that by loosening the nuts on the bolts the brackets may be moved along the support members and removed when the slot second portions are aligned with the nuts to thereby allow the removal of the brackets from the drum while retaining the skin panels connected in a loose fashion to the support members to facilitate cleaning of the skin panels.

6. A method for cleaning a food processing apparatus having a tank, a drum rotatable inlet end plate, an outlet end plate, and a plurality of support members which extend between the inlet end plate and the outlet end plate, where two support members which are spaced from one another define a pair of support members, and a curved perforated skin panel, having two flanges which extend generally radially outwardly to engage against the support members of the pair, and a clamping means which releasably secures the panel flanges to the support members; the method comprising:
   a) releasing the clamping means to allow the skin panels to hang loosely from the support members while still retained in association with the support members;
   b) rotating the drum with the skin panels hanging loosely thereon; and
   c) discharging a spray of cleaning fluid onto the rotating drum.

7. The method of claim 6 wherein the spray discharging step comprises directing water upwardly from a plurality of spray nozzles mounted to the apparatus tank onto the drum as it rotates toward the spray nozzles.

8. A food processing apparatus comprising:
   a) a tank;
   b) a drum rotatable within the tank, wherein the drum has a plurality of support members which extend between an inlet plate and an outlet plate;
   c) at least one perforated skin panel which extends between support members, wherein the skin panel has a flange which extends adjacent a support member;
   d) a bracket which overlies the skin panel flange, wherein portions of the bracket define at least two fastener openings; and
   e) a plurality of clamps, wherein each clamp is positioned to engage the panel flange between the bracket and the support member, and wherein the clamp has portions which extend through the support member, such that when the clamp is in a nonclamped disposition, it is retained on the support member and supports the panel in spaced relation to the support member, thereby permitting access of a cleaning spray to the interstices between the panel flange and the support member.

9. The food processing apparatus of claim 8 wherein each clamp comprises:

a) a first member which extends through the bracket, the panel flange and the support member;

b) a handle which is pivotably connected to the first member;

c) a clamping member slidably mounted on the first member; and d) a link which extends between the handle and the clamping member, wherein pivoting of the handle member causes the clamping member to clamp the panel flange to the support member.

10. The food processing apparatus of claim 8 further comprising:

a) a clean in place manifold connected to the tank; and b) a plurality of nozzles mounted to the manifold and directed to discharge cleaning fluid onto the drum.

11. The food processing apparatus of claim 10 wherein the nozzles are positioned on the manifold to discharge a spray of cleaning fluid upwardly onto the drum as it is rotated.

* * * * *